United States Patent
Kusase et al.

(10) Patent No.: US 6,700,277 B2
(45) Date of Patent: Mar. 2, 2004

(54) VEHICLE AC GENERATOR

(75) Inventors: Shin Kusase, Obu (JP); Tsutomu Shiga, Nukata-gun (JP)

(73) Assignee: Denso Corporation, Kariya (JP)

( * ) Notice: Subject to any disclaimer, the term of this patent is extended or adjusted under 35 U.S.C. 154(b) by 14 days.

(21) Appl. No.: 10/122,340

(22) Filed: Apr. 16, 2002

(65) Prior Publication Data

US 2002/0163274 A1 Nov. 7, 2002

(30) Foreign Application Priority Data

May 1, 2001 (JP) .................................. 2001-133876
Jan. 10, 2002 (JP) ...................................... 2002-3239

(51) Int. Cl.[7] .............................................. H02K 19/26
(52) U.S. Cl. ........................ 310/184; 310/179; 310/263
(58) Field of Search ................................ 310/184, 179, 310/263, 261; 322/28, 99, 63–66, 68

(56) References Cited

U.S. PATENT DOCUMENTS

| | | | | |
|---|---|---|---|---|
| 4,075,519 A | * | 2/1978 | Mrcun | 310/67 R |
| 4,381,483 A | * | 4/1983 | Muto et al. | 322/99 |
| 4,588,915 A | * | 5/1986 | Gold et al. | 310/194 |
| 4,882,515 A | * | 11/1989 | Radomski | 310/263 |
| 5,780,996 A | * | 7/1998 | Kusase et al. | 322/28 |
| 2002/0084773 A1 | * | 7/2002 | Nishimura et al. | 322/29 |

* cited by examiner

Primary Examiner—Thanh Lam
(74) Attorney, Agent, or Firm—Oliff & Berridge, PLC

(57) ABSTRACT

A rotor of a vehicle AC generator is comprised of a rotor core and a field coil. The rotor core is comprised of a boss portion and a plurality of claw-pole portions bending to respectively extend in axial directions from outer circumferences of the boss portion to interleave with each other to form a zigzag space between the claw-pole portions. The field coil comprises a main coil portion disposed on the boss portion, a sub-coil portion disposed between the main coil and the claw-pole portions and a flywheel diode connected in parallel with the main coil. When the field current is cut off, current circulating through the main coil is increased because the energy accumulated in the sub-coil is discharged.

11 Claims, 3 Drawing Sheets

VEHICLE AC GENERATOR

CROSS REFERENCE TO RELATED APPLICATION

The present application is based on and claims priority from Japanese Patent Applications 2001-133876, filed May 1, 2001 and 2002-3239, filed Jan. 10, 2002, the contents of which are incorporated herein by reference.

BACKGROUND OF THE INVENTION

1. Field of the Invention

The present invention relates to an AC generator to be mounted in an automotive vehicle such as a passenger car or a truck.

2. Description of the Related Art

Various engine accessories mounted on a vehicle engine are generally driven by the engine via a belt. A vehicle AC generator, which is one of the engine accessories, is usually connected by a belt to the crankshaft of an engine. Therefore, if the engine rotation speed changes cyclically, the tension of the belt also changes cyclically, thereby causing vibration and noises.

In order to prevent such a problem, it has been proposed that the output current of the vehicle AC generator is switched on and off at a suitable timing. When the rotation speed of the crankshaft lowers, the output current of the AC generator is cut to reduce the torque to drive the AC generator so that the belt tension can be controlled to be constant thereby reducing the vibration or noise.

However, it is rather difficult to put the above control into practice because reliable electric parts and/or elements to be used for the above control are not available at a reasonable cost.

The output current of the AC generator also can be reduced if the time constant of the field coil of the AC generator can be reduced to a certain value. If the time constant is very small, the field current can be reduced in a short time so that the output current can be controlled in a short time. However, the field coil has a large number of turns wound around a magnetic core in order to provide necessary magnetic flux and, therefore, a large inductance. This necessarily increases the time constant, and the field current can not be changed in a short time.

SUMMARY OF THE INVENTION

Therefore, the present invention has been made in view of the above problems.

It is a main object of the invention to provide an improved AC generator for a vehicle, the time constant of which is sufficiently small.

According to a feature of the invention, a rotor of a vehicle AC generator includes a rotor core and a field coil that is comprised of a main coil and a sub-coil and a flywheel diode. The rotor core has a plurality of trapezoidal claw-pole portions that extend in opposite axial directions to interleave with each other to form a zigzag space between adjacent claw-pole portions. The main coil is disposed on a boss portion of the rotor core, and a sub-coil is series-connected to the main coil and disposed in the zigzag space. The flywheel element is connected in parallel with the main coil.

When the field current is cut off by a switching element of a voltage regulator, current that circulates through the main coil and the flywheel diode increases because the energy accumulated in the sub-coil is discharged. This increases the energy loss of the flywheel so that the circulating current disappears in a period shorter than a vehicle AC generator without the sub-coil. The flywheel element may be disposed in the rotor, so that a lead wire may not be extended from the joint of the main coil and the sub-coil. It is preferable that a resistor is connected in series with the flywheel element, because the resistor increases energy loss and decreases the life of the current that circulates through the main coil.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle AC generator according to a preferred embodiment of the invention is described with reference to FIGS. 1–5.

Figure 2:
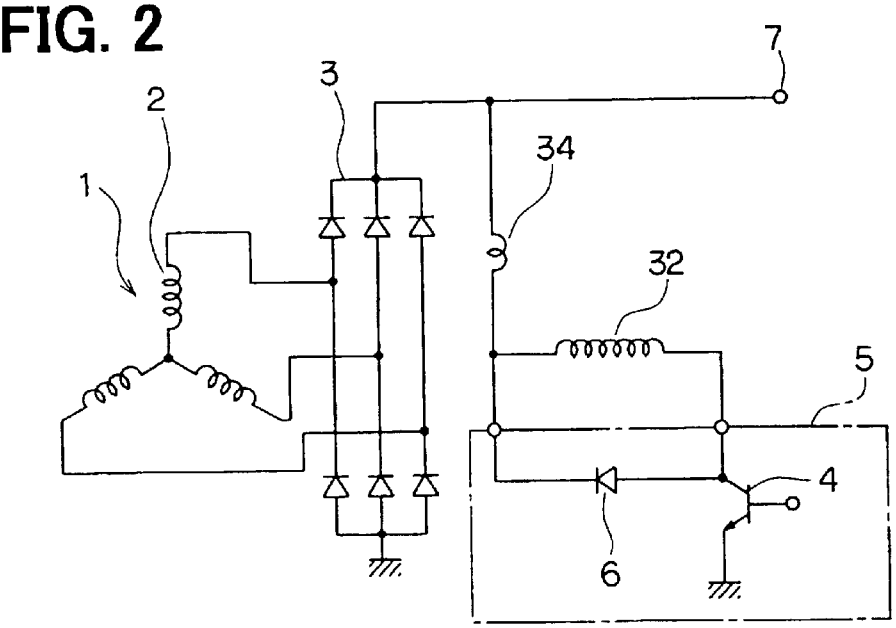
FIG. 2 is a circuit diagram of the vehicle AC generator according to the preferred embodiment.

As shown in FIG. 2, a rotor 10 is comprised of a pair of rotor cores 20, a field coil 30, a magnetically permeable member 36 and a rotary shaft 38.

Each rotor core 20 is made of soft iron or low carbon-steel and has a boss portion 22, a disk portion 24 that extends radially outward from an axial end of the boss portion 22 and a plurality of claw poles 26 that has trapezoidal peripheral surfaces and bends to extend in the axial direction of the rotor 10. The pair of rotor cores 20 is coupled to each other so that the claw poles of one of the pole cores 20 interleave with the claw poles of the other to form a zigzag space between them.

The field coil 30 is comprised of a main coil 32 and a sub-coil 34 that is series-connected to the main coil 32. The main coil 32 is wound around the boss portions 22 of the pair of rotor cores 20, and the sub-coil 34 is disposed in the zigzag space. The sub-coil 34 is a 330 turn coil formed of a copper wire of about 0.8 mm in diameter and has about 23 $\Omega$. The sub-coil is a 50 turn coil made of a wire of 0.6 mm in diameter. Therefore, magnetic flux necessary for the output power is supplied by the main coil 32 and the sub-coil 34.

The magnetically permeable member 36 contacts a portion of the claw poles 26 and the disk portion 24. The magnetically permeable member 36 is a ring-shaped laminate of cold-forged steel sheets.

Figure 1:
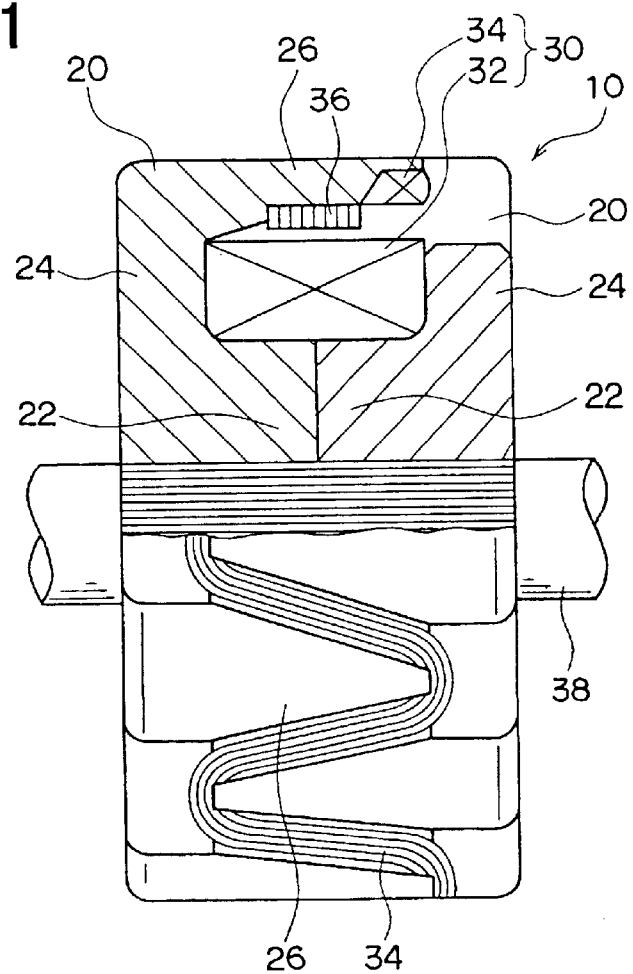
FIG. 1 is a schematic cross-sectional view of a rotor of a vehicle AC generator according to a preferred embodiment of the invention.

As shown in FIG. 1, the magnetically permeable member 36 is disposed inside the claw poles 26 and at the middle of the axial length thereof. The claw poles are magnetically bridged or short-circuited by the magnetically permeable member 36.

As shown in FIG. 2, the vehicle AC generator is comprised of a stator 1 that includes, in addition to the rotor 10, a stator winding 2, a three-phase full-wave rectifier unit that has six diodes to converts AC power into DC power and a field current control unit 5. The field current control unit 5 has a switching transistor 4 that switches on and off the current supplied to the main coil 32 and the sub-coil 34 to control the output voltage of the AC generator. The field current control unit 5 has a flywheel diode 6 that is connected in parallel with the main coil 32.

In operation, when the switching transistor 4 is turned on, field current is supplied to the main coil 32 and the sub-coil 34, so that the claw poles 26 are polarized by both the main coil 32 and the sub-coil 34 into N pole and S poles alternately in the circumferential direction. As a result, when the rotor 10 rotates, necessary AC electric power is generated in the stator winding. This AC electric power is rectified by the rectifier unit 3 and outputted at an output terminal 7.

When the switching transistor 4 is turned off, the magnetic flux supplied from the rotor core 20 is maintained by the main coil 32 because the field current still circulates through the main coil 32 via the flywheel diode 6. Thereafter, the current circulating through the main coil gradually decreases. Because the main coil 32 is a portion of the field coil 30, the inductance of the main coil 32 that affects the circulating time of the field current is smaller than the inductance of the whole field coil 30. In other words, the current circulating through the main coil 32 increases, so that energy loss of the diode increases. Accordingly, the current circulating through the main coil 32 attenuates in a shorter period.

Because the sub-coil 34 has no parallel flywheel diode, the current flowing through the sub-coil 34 disappears instantly. However, the gradually decreasing current flowing through the main coil 32 prevents harmful surge current.

Figure 4:
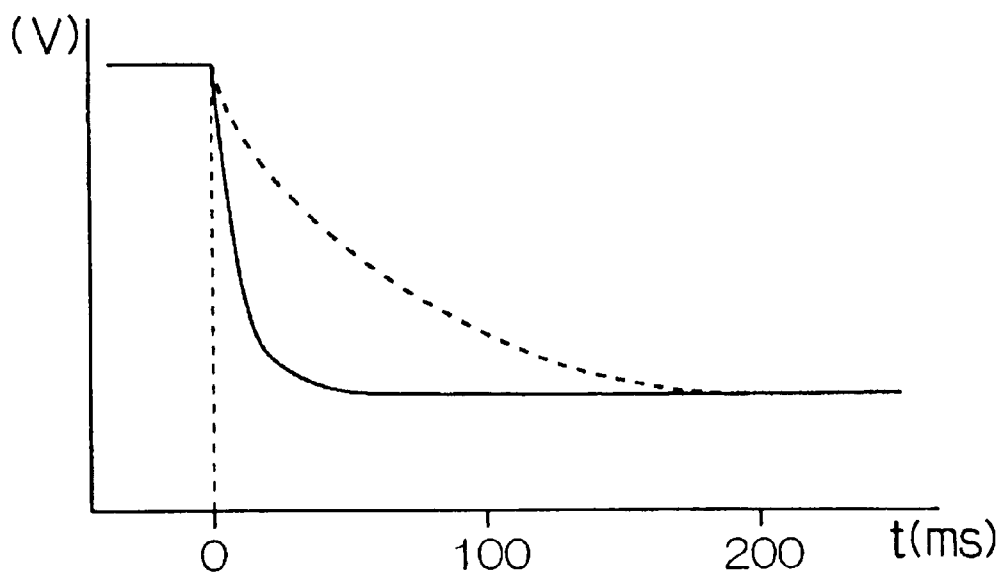
FIG. 4 is a graph showing magnetic response time of the vehicle AC generator according to the preferred embodiment.
Figure 5:
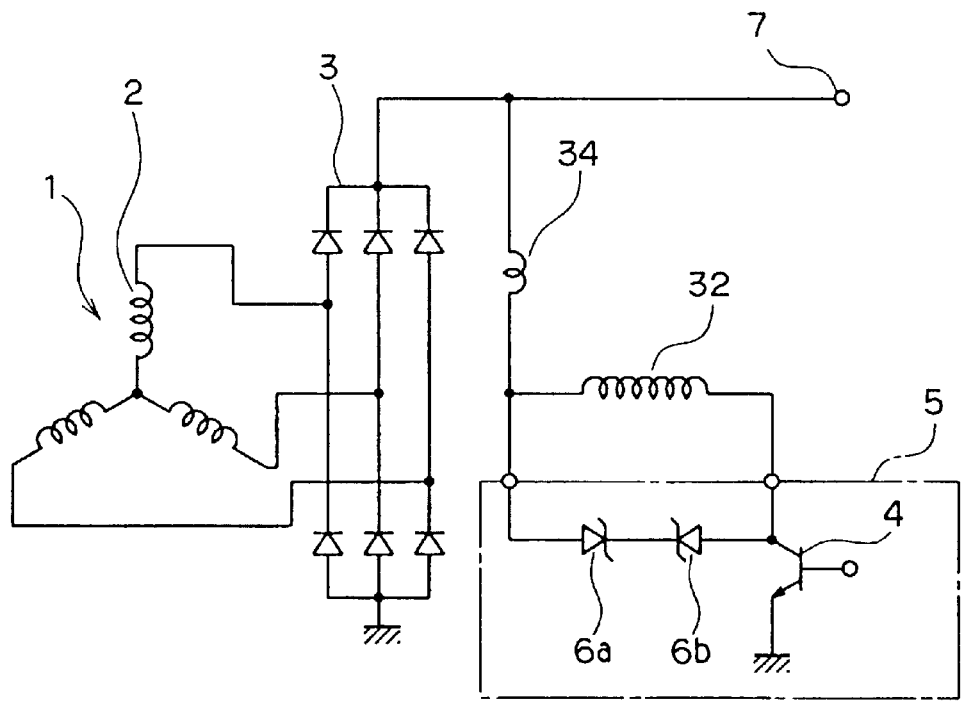
FIG. 5 is a circuit diagram of a variation of the vehicle AC generator according to the preferred embodiment.

The magnetically permeable member 36 is disposed inside the claw poles 26 to bridge the same. While current flows through the sub-coil 34, the magnetic flux generated by the sub-coil 34 is supplied to the claw poles via the magnetically permeable member 36. However, the magnetic flux disappears as soon as the current supply is stopped. Accordingly, the magnetic flux generated by the current circulating through the main coil bypasses the magnetically permeable member 36 and is not supplied to the stator 1 any longer. That is, the time constant or magnetic response time of the rotor 10 viewed from the stator 1 is drastically reduced, as shown in FIG. 4. In FIG. 4, a dotted line indicates a no-load induced voltage curve of a conventional AC generator, and a solid line indicates a no-load induced voltage curve of a sample of the AC generator according to the preferred embodiment of the invention. Therefore, it is possible to control the field current at a very high speed so that fluctuation in the rotation speed, torque or vibration of a belt can be prevented effectively. For example, the fluctuation of the rotation speed can be improved by the above described structure to be less than 40 rpm from 200 rpm.

Figure 3:
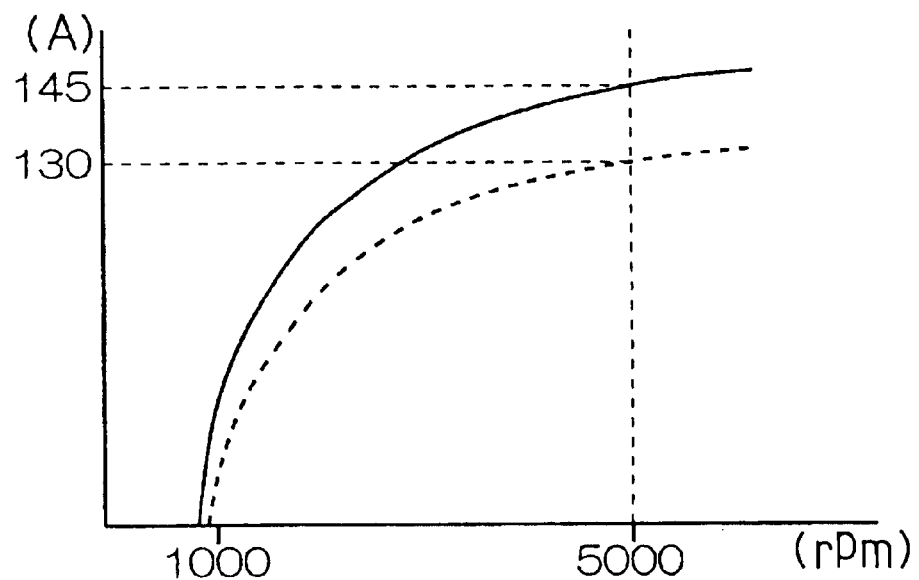
FIG. 3 is a graph showing a output characteristic of the vehicle AC generator according to the preferred embodiment.

The above structure having the sub-coil 34 increases the output power of the AC generator, as shown in FIG. 3. In FIG. 3, a dotted line indicates output current of a conventional AC generator (the outside diameter of which is 130 mm and the rated power thereof is 130 A), and a solid line indicates output current (in ampere) of a sample of the AC generator according to the preferred embodiment of the invention that has the same size as the conventional AC generator.

Figure 6:
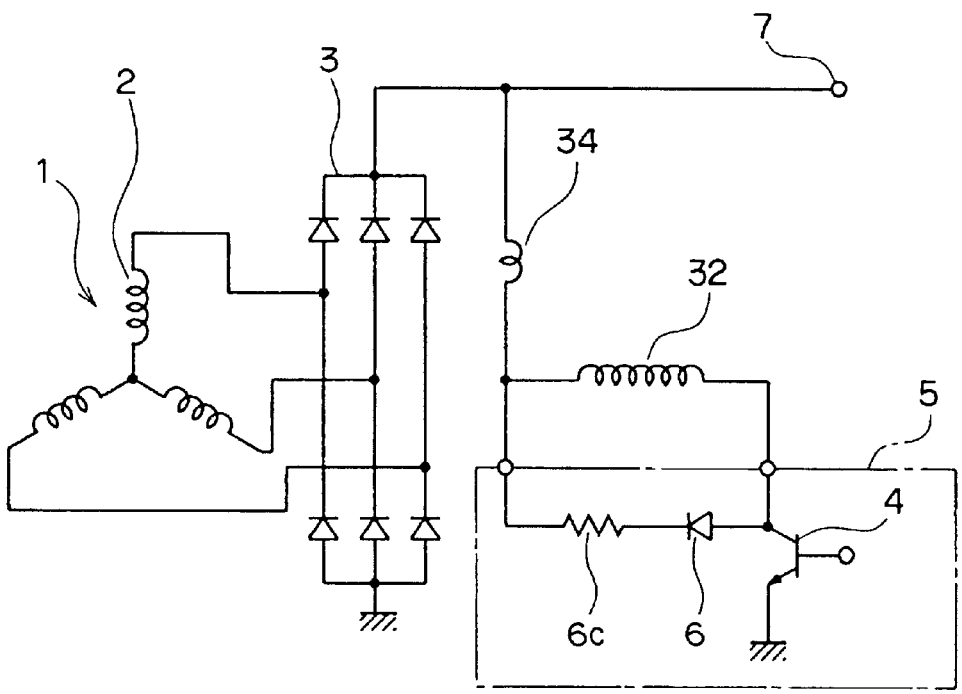
FIG. 6 is a circuit diagram of another variation of the vehicle AC generator according to the preferred embodiment.

Variations of the vehicle AC generator according to the preferred embodiment of the invention is described with reference to FIGS. 6 and 7.

A pair of inversely connected Zener diodes 6a and 6b is substituted for the flywheel diode 6 shown in FIG. 2. The pair of inversely connected Zener diodes 6a and 6b increases power loss when the current is circulating through the main coil 32, so that the current can attenuate in a shorter time. This reduces the time constant of the field coil 30 further.

A resistor 6c is connected in series with the flywheel 6. The resistor 6c increases power loss when the current is circulating through the main coil 32, so that the current can attenuate in a shorter time. This reduces the time constant of the field coil 30 further.

The main coil 32 and the sub-coil 34 can be connected in parallel to each other. If the total number of turns of the field coil 30 is constant, the ratio of the number of turns to the resistance can be increased, so that the magnetic response time of the rotor 10 while the current is circulating through the field coil 30 can be reduced. If the number of turns of the main coil 32 and the sub-coil 34 is different, it is possible to mainly supply the current to one of the coils that has a low impedance. This can reduce the magnetic response time further.

It is also possible to place the flywheel diode 6 inside the rotor 10. Therefore, it is not necessary to extend a lead wire from the joint of the main coil 32 and the sub-coil 34 out of the rotor 10. It is also possible to connect the flywheel diode 6 in parallel with the sub-coil 34.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle AC generator including a stator, a rotor having a rotor core and a field coil wound around said rotor core, a flywheel element and a field current control unit for controlling field current supplied to said field coil, wherein said rotor core comprises a cylindrical boss portion, a pair of disk portions extending radially outward from opposite axial ends of said boss portion, and a plurality of trapezoidal claw-pole portions bending to respectively extend in axial directions from outer circumferences of said pair of disk portions to alternately interleave with each other to form a zigzag space between said claw-pole portions, thereby forming a magnetic path for supplying magnetic flux to said stator, said field coil comprises a main coil portion disposed on said boss portion and a sub-coil portion series-connected to said main coil and disposed between said main coil and said claw-pole portions to jointly cross said magnetic path, and said flywheel element is connected in parallel with one of said main coil and said sub-coil.

2. The AC generator as claimed in claim 1, wherein said flywheel element is disposed in said rotor.

3. The AC generator as claimed in claim 1, further comprising a resistor connected in series with said flywheel element.

4. The AC generator as claimed in claim 1, wherein said flywheel element comprises a pair of Zener diodes inversely connected to each other.

5. The vehicle AC generator as claimed in claim 1, further comprising a magnetically permeable member disposed between said main coil and said sub-coil in contact with one of said disk portions.

6. The vehicle AC generator as claimed in claim 5, wherein said magnetically permeable member comprises a laminate of steel sheets.

7. The vehicle AC generator as claimed in claim 1, wherein said sub-coil portion is disposed in said zigzag space.

8. The vehicle AC generator as claimed in claim 5, wherein said magnetically permeable member is disposed between said main coil portion and said sub-coil portion.

9. A vehicle AC generator driven by an engine, said vehicle AC generator including a stator, a rotor having a rotor core and a field coil disposed in said rotor core, a flywheel element and a field current control unit having a switch element for controlling field current supplied to said field coil, wherein said rotor core comprises a boss portion and a plurality of magnetic poles to form a magnetic path for supplying magnetic flux to said stator, said field coil comprises a main coil portion wound around said boss portion and a sub-coil portion series-connected to said main coil and wound around said magnetic poles to jointly cross said magnetic path, and said flywheel element is connected in parallel with one of said main coil and said sub-coil.

10. The vehicle AC generator as claimed in claim 9, further comprising a ring-shaped member made of soft iron disposed under said magnetic poles to magnetically bridge said magnetic poles.

11. The vehicle AC generator as claimed in claim 9, wherein said switching element is controlled to turn on and off in response to fluctuation of rotation of said engine, thereby reducing vibration and noises.

* * * * *